United States Patent [19]

Bagnall-Wild et al.

[11] Patent Number: 4,789,339
[45] Date of Patent: Dec. 6, 1988

[54] GUNNERY TRAINING SYSTEM

[75] Inventors: Ralph H. Bagnall-Wild, Helensburgh; Neil F. Grant, Glasgow, both of Scotland

[73] Assignee: Barr & Stroud Limited, Glasgow, Scotland

[21] Appl. No.: 7,141

[22] Filed: Jan. 27, 1987

[51] Int. Cl.$^4$ ............................................... F41F 27/00
[52] U.S. Cl. ......................................... 434/20; 434/16
[58] Field of Search ...................... 434/16, 17, 18, 19, 434/20

[56] References Cited

U.S. PATENT DOCUMENTS 4,639,222 1/1987 Vishlizky ........................... 434/20

Primary Examiner—Leo P. Picard
Attorney, Agent, or Firm—Pennie & Edmonds

[57] ABSTRACT

A gunnery training system comprises a conventional armored vehicle having a gun and a fire control system to which is releasably attached portable training equipment (TT), which in operation uses almost all features of the conventional equipment within the vehicle so that a high standard of realism is obtained. The equipment (TT) delivers simulated scenic images with overwritten simulated target images to the visual display of the vehicle, the scenic images being selected by gun orientation signals extracted from the fire control system. Initiation of the laser rangefinder which forms part of the fire control system causes the equipment (TT) to deliver range data on the simulated target so that the fire control system overwrites a corresponding aiming mark on the visual display. When the gun trigger switch is operated the equipment (TT) captures the location of the aiming mark and computes the displacement between that location and the position of the simulated target as a measure of training efficiency.

4 Claims, 2 Drawing Sheets

GUNNERY TRAINING SYSTEM

This invention relates to a gunnery training system.

According to the present invention there is provided a gunnery training system comprising an armoured vehicle having a gun and a conventional fire control system associated therewith, the fire control system comprising a laser rangefinder, a gun trigger switch, means for determining ballistic and environmental parameters, means for determining gun orientation, a thermal image viewing arrangement, a video display device for displaying a video version of the thermal image captured by the viewing arrangement, and a fire control computer arranged for electronically injecting into the video display device an aiming mark representative of projectile position, which position is calculated by the fire control computer from known target range, known ballistic and environmental parameters and known gun orientation, the improvement comprising the provision of portable training equipment capable of being releasably connected to the fire control system and when so connected inhibiting emission of laser radiation from the laser rangefinder, inhibiting operation of the thermal image viewing arrangement, and providing on the video display device images from a data store, which images are selected from the data store by gun orientation signals extracted from the fire control system, one or more of the selected images incorporating a simulated target at a simulated range, the simulated range being signalled to the fire control system during the appearance of the pertaining simulated target on the video display device by initiation of the laser rangefinder, whereby the fire control computer is enabled to generate an aiming mark, and the equipment further comprising means for capturing the location of the aiming mark when the gun trigger switch is operated and computing the displacement between the simulated target position and the captured aiming mark position as a measure of training efficiency.

Preferably the portable training equipment further comprises means for computing the time interval between the initial presentation of the simulated target in the image and operation of the gun trigger switch as a further measure of training efficiency.

Preferably also the training equipment comprises means for scoring the or each measure of training efficiency against a standard.

It will be understood that the data store images may incorporate simulated targets which are either moving or stationary and the standard against which the training efficiency measures are scored may vary according to whether the simulated target is moving or is stationary.

It will further be understood that the training system utilises almost all features of the conventional equipment within an armoured vehicle so that a high standard of realism is obtained. Thus movement in both elevation and traverse of the gun is real, as is operation of all components of the fire control system other than the laser rangefinder and the thermal image viewing arrangement. Although real projectiles may be fired from the gun it is envisaged that either no projectiles at all are actually fired or projectile blanks are fired. In either case the training system is cost effective and danger free. In addition to provision of the portable training equipment it is of course necessary for the armoured vehicle to be located with sufficient space around it to enable movements of the gun to be free from obstruction.

By way of example of the data stored images these are conveniently stored in TV compatible digital form and may contain portions of standard scenes such as "sky" or "out of focus foreground" which ar selected in whole or in part in the event that gun inclination is greater than predetermined limits in both elevation and depression. For the purposes of training there is no requirement to permit 360° gun traverse and accordingly the training equipment can be releasably connected to the fire control system by a trailing cable.

An embodiment of the present invention will now be described by way of example with reference to the accompanying drawings, in which.

Figure 1:
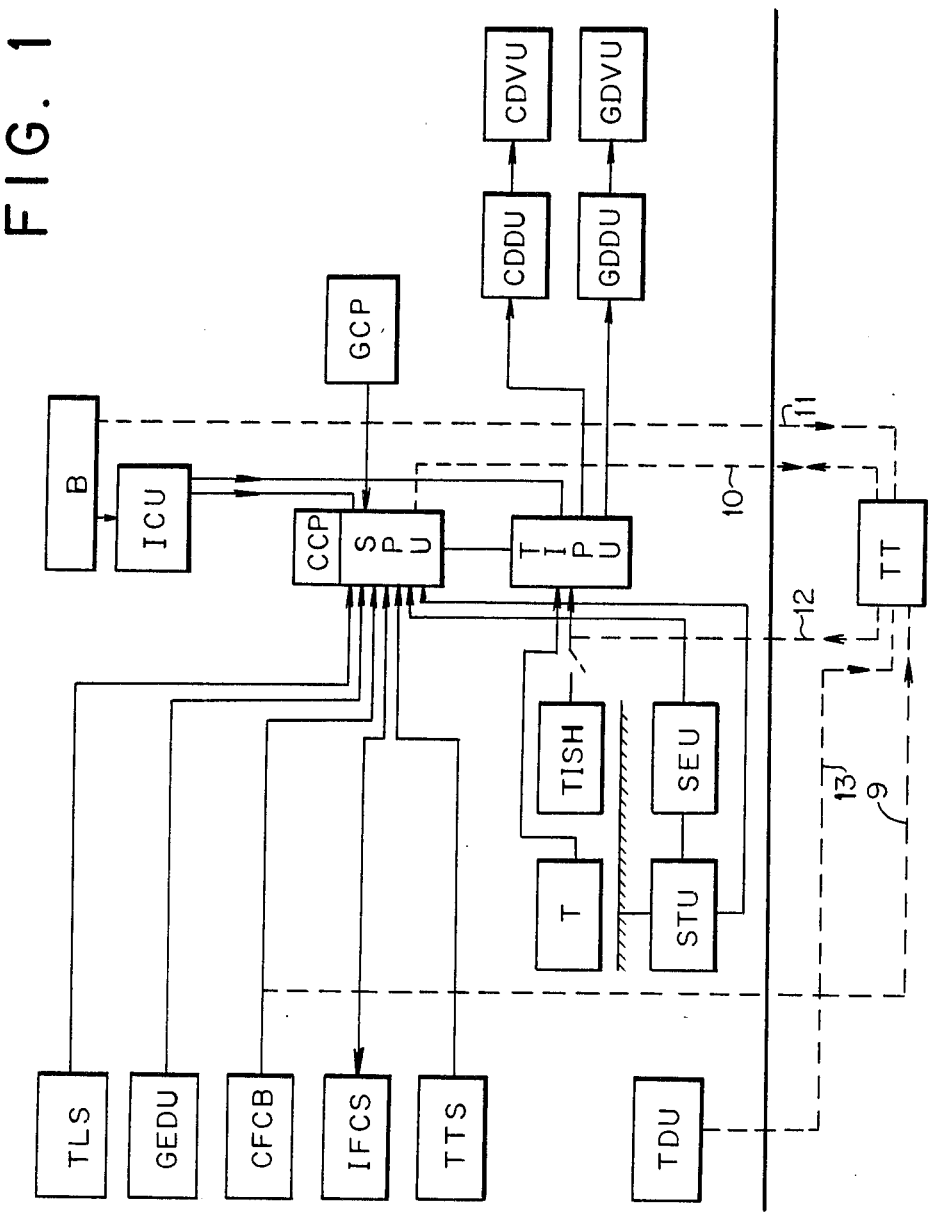
FIG. 1 illustrates the embodiment in block diagrammatic form.

As is shown in FIG. 1, the components of a conventional fire control system associated with a gun in an armoured vehicle such as a tank, comprise a tank laser sight (TLS), a gun elevation displacement unit (GEDU), a commander's fire control box (CFCB), an improved fire control system (IFCS), a trunnion tilt sensor (TTS), a servo trunnion unit (STU) and a servo electronic unit (SEU), all of which provide signals to symbology processing unit (SPU) to which is coupled commander's control panel (CCP) and to a gunner control panel (GCP). A thermal imaging viewing arrangement is provided by a telescope (T) (with a wash/wipe facility) and a thermal imaging sensor head (TISH), the outputs of which are connected to a thermal imaging processing unit (TIPU) which is coupled to the output of the symbology processing unit (SPU). The output of the thermal imaging processing unit (TIPU) is fed in parallel to a commander's display drive unit (CDDU) (with a commander's display viewer unit (CDVU)) and to a gunner's display drive unit (GDDU) (with gunner's display viewer unit (GDVU)). Power is supplied to the system from a 28 volt D.C. battery (B) via an isolating and converting unit ICU which provides the required voltages and power levels for the individual components.

Azimuth movements of the gun turret are sensed by a traverse displacement unit (TDU) and are signalled to component IFCS, as is known per se.

The equipment thus far described is conventional and as is known the thermal scanner (components T and TISH) is mounted on a servo controlled platform which follows the gun in elevation, the entire equipment being mounted on the gun turret so that it follows azimuth turret movements. The SPU component further generates the aiming mark and delivers that aiming mark to the TIPU component for electronic superimposition on the thermal image scene which is displayed by components CDVU and GDVU.

In accordance with the present invention the gunnery training system comprises the foregoing components together with portable training equipment (TT) which is releasably coupled to the vehicular components as indicated by the various broken lines in FIG. 1. Thus component TT receives input signals on lines 9, 10 and 13, a power supply on line 11 and delivers an output signal on line 12, and is also capable of delivering a signal on line 10. Additionally, when component TT is connected the radiation-emitting part of the TLS unit is disabled, preferably by physical disconnection thereof, and the output from the TISH component is likewise disconnected.

Figure 2:
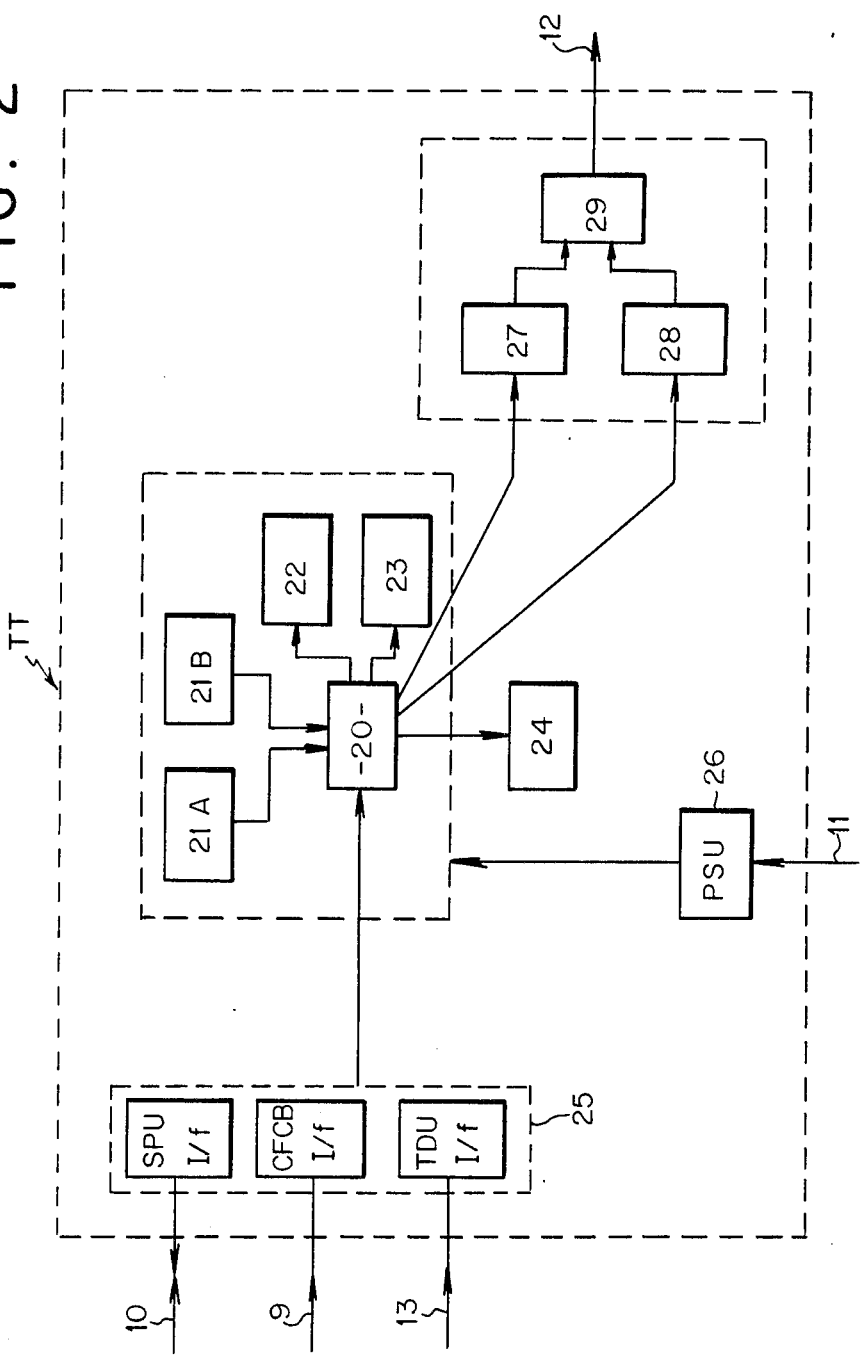
FIG. 2 illustrates a part of FIG. 1 in greater detail.

FIG. 2 illustrates the training equipment (TT) in greater detail from which it will be seen that the equipment comprises a central computer 20 coupled to disc drive data stores 21A, 21B, a visual display unit 22, a keyboard 23 and a printer 24, and provided with an interface 25 for interfacing computer 20 to the SPU, CFCB and TDU components via the lines 10, 9, 13 respectively. Power delivered to the equipment TT on line 11 is processed by a power supply unit 26 and distributed to the various components of TT at the required voltage and power levels. The computer 20 delivers image data to a scene store 27 and target data to a target store 28 the outputs of which stores are mixed by video mixer 29 for delivery along line 12 to the TIPU unit in substitution for the images conventionally generated by the TISH unit.

One of the drive data stores 21A is pre-programmed with the image sequences in digital form whilst the other data store 21B is pre-programmed with housekeeping information for computer 20 together with target data to be offloaded to store 28.

The images delivered along line 12, which may be dynamic or static, incorporate simulated targets at known simulated ranges and via the TIPU unit are displayed on the CDVU and GDVU units so that the gun crew are presented with a simualted scene and are free to operate the gun in both elevation and azimuth, the gunorientation signals being fed back to the computer 20 in order to adjust, by image selection from store 27, the particular image which is displayed on units CDVU and GDVU so that there is apparent correlation of the images with gun movement. The location of the simulated targets in the images is, of course, predetermined and when the gun crew determine that the gun is favourably orientated to fire a projectile which will hit the simulated target, the laser range unit (TLS) is initiated by the tank crew by operation of unit CFCB, which initiation is signalled along line 10 and calls up from the computer 20 of equipment TT the simulated range of the simulated target currently on display in units CDVU and GDVU. This range is delivered along line 10 to unit SPU in substitution for the range provided by the laser rangefinder (TLS) whereby the SPU unit generates an aiming mark which, by means of the TIPU unit, overwrites the image on units CDVU and GDVU and is moved by the gun crew into superimposition with the simulated target at which point the gun trigger switch forming part of unit CFCB is operated.

During a training session, in the absence of live projectiles, the operation of the gun trigger switch is fed to the equipment TT along line 9 which consequentially captures the aiming mark position when the gun trigger switch is operated and computes the displacement between the simulated target position and the captured aiming mark position as a first measure of training efficiency. A second measure of training efficiency is computed by determining the time interval between appearance of the simulated target in the displayed image and operation of the gun trigger switch.

Following a simulated engagement the equipment TT is arranged to automatically score the training efficiency measures achieved by a gun crew by comparison of the measured training efficiency against a predetermined standard.

It will be understood that the disc drive store unit 21A of the equipment TT is provided with a sequence of scenes which, on initialization of the training sequence by means of the housekeeping program in disc drive store unit 21B, are loaded into frame store 27 for subsequent movement in accordance with gun orientation signals in real time; and simulated targets are separately stored in a separate store 28 for injection into the scene on a pseudo random basis which may be pre-programmed in the program of unit 21B or which may be under the manual control of an instructor operating the keyboard 23 of unit TT.

What is claimed is:

1. A gunnery training and trainee-reaction measuring system having an actual armoured vehicle having a gun and a conventional fire control system, the fire control system having a laser rangefinder, a gun trigger switch, means for determining a ballistic and environmental parameters, means for determining gun orientation, a thermal image viewing arrangement, a video display device for displaying a video version of the thermal image captured by the viewing arrangement, and a fire control computer arranged for electronically injecting into the video display device an aiming mark representative of projectile position, which position is calculated by the fire control computer from known target range, known ballistic and environmental parameters and known gun orientation, the improvement comprising the provision of portable training equipment capable of being releasably connected to the fire control system and comprising means for inhibiting emission of laser radiation from the laser rangefinder, means for inhibiting operation of the thermal image viewing arrangement, a video image data store and means for providing on the video display device images selected from the data store, one or more of the selected images incorporating a simulated target at a simulated range, means for extracting gun orientation signals from the fire control system, and means for selecting from the data store the displayed video images according to the extracted gun orientation signals, means for signalling the simulated range to the fire control system during the appearance of the pertaining simulated target on the video display device by initiation of the laser rangefinder, whereby the fire control computer is enabled to generate an aiming mark, and the training equipment further comprising means for capturing the location of the aiming mark when the gun trigger switch is operated and means for computing the displacement between the simulated target position and the captured aiming mark position as a measure of training efficiency.

2. A system as claimed in claim 1, wherein the portable training equipment further comprises means for computing the time interval between the initial presentation of the simulated target in the image and operation of the gun trigger switch as a further measure of training efficiency.

3. A system as claim 1, wherein the training equipment comprises means for scoring the or each measure of training efficiency against a standard.

4. A system as claimed in claim 1, including means for monitoring gun inclination and wherein the data store is provided with images stored in TV compatible digital form containing portions of standard scenes such as "sky" or "out of focus foreground" and means for selecting said standard scene portions in whole or in part in the event that gun inclination is greater than predetermined limits in both elevation and depression.

* * * * *